June 10, 1941.  W. R. GOSS ET AL  2,245,268
DYNAMOELECTRIC MACHINE
Filed Nov. 12, 1940
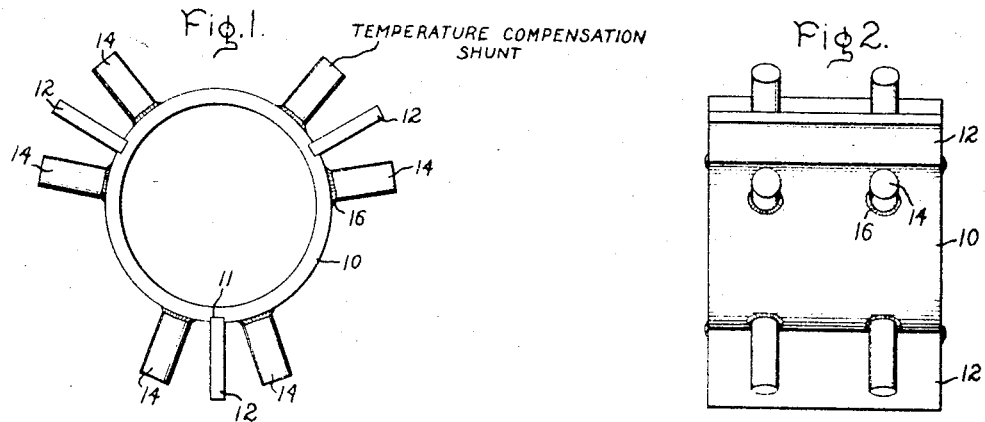
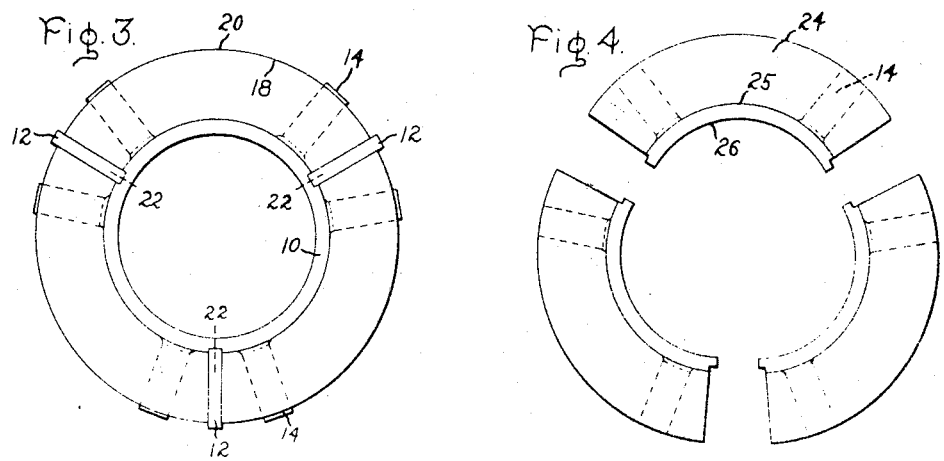
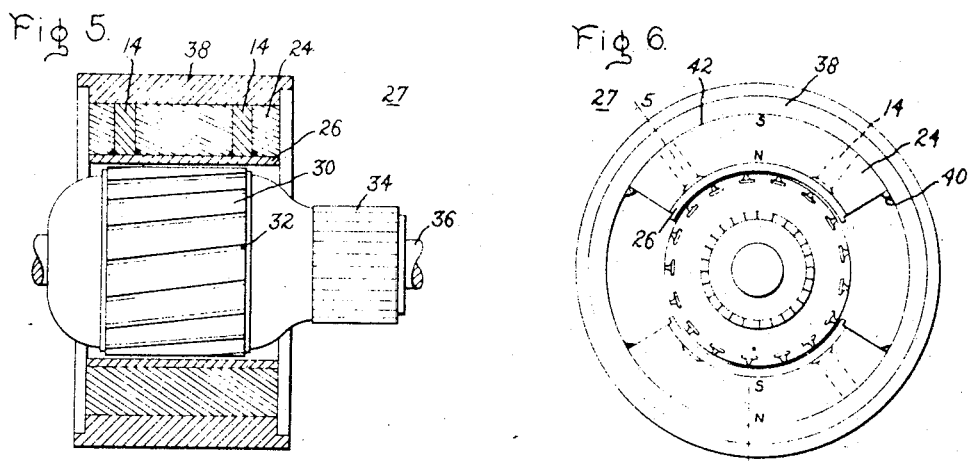
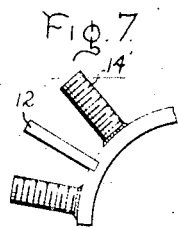
Inventors:
Wesley R. Goss,
David R. Shoults,
by Harry E. Dunham
Their Attorney.

Patented June 10, 1941

2,245,268

UNITED STATES PATENT OFFICE 2,245,268

DYNAMOELECTRIC MACHINE

Wesley R. Goss, Fort Wayne, Ind., and David R. Shoults, Schenectady, N. Y., assignors to General Electric Company, a corporation of New York Application November 12, 1940, Serial No. 365,304

6 Claims. (Cl. 171—227)

This invention relates to improvements in dynamo-electric machines of the type having a permanent magnet excitation system and more particularly to an improved construction of the magnetic field structure for such machines, whereby the effect on the excitation flux caused by flux changes occurring in the field magnets due to changes in temperature are substantially compensated.

In connection with the operation of certain types of apparatus such, for example, as regulator equipment employed for maintaining at a constant value the speed of a rotary shaft, permanent magnet tachometers or pilot generators are frequently employed to generate a voltage which is variable in accordance with the speed of the shaft to be regulated. The voltage of the pilot generator is usually referred to or balanced against a reference voltage. Such regulating equipment is often designed to respond to a voltage difference of $\frac{1}{10}$ of a volt out of say 200 volts. Thus the importance of obtaining a voltage output from the pilot generator which is at all times proportional to the speed becomes obvious. We have found in examining the characteristics of available dynamo-electric machines having permanent magnet excitation systems that there were appreciable temperature errors in the voltage outputs of such machines even under no load conditions. This temperature error was discovered to be due to a reversible change in the air gap flux in the machine which takes place with changes in temperature; that is, the flux strength of the magnet falls off slightly when heated from zero degrees to a certain higher temperature but it regains substantially its original strength when cooled to its former temperature. Because of this tendency of the air gap flux to decrease with increasing temperatures it is important that suitable compensating means be provided if the speed regulating equipment is to operate with the desired degree of accuracy. The foregoing merely serves to illustrate a useful application of dynamo-electric machines incorporating the principles of my invention and other applications of such dynamo-electric machines operating as motors or generators will of course suggest themselves in those situations where it is desirable to provide a field flux, a voltage output or speed of the dynamo-electric machine which is substantially independent of the temperature of the permanent magnets which produce this flux.

It is accordingly an object of this invention to provide an improved permanent magnet excitation system for a dynamo-electric machine which will inherently compensate for the effect of temperature variations upon the operating characteristics of the dynamo-electric machine.

It is a more specific object of this invention to provide an improved permanent magnet field structure for a dynamo-electric machine whereby the strength of the active magnetic field or the air gap flux may be maintained substantially constant irrespective of temperature variations of the permanent magnet employed to produce the magnetic field during normal operation.

The novel features which are characteristic of our invention are pointed out in the appended claims. Our invention, however, will be understood more readily from reference to the following specification when considered in connection with the accompanying drawing. In the drawing, Figs. 1 and 2 illustrate respectively end elevation and side elevation views of a portion of a dynamo-electric machine field structure during a stage of manufacture and which incorporates the principles of our invention; Fig. 3 is an end elevation view corresponding to the structures shown in Fig. 1 but at a later stage of manufacture; Fig. 4 is an end elevation view corresponding to Fig. 3 but with the parts cut away and made ready for assembly to form the field excitation system of a dynamo-electric machine; Fig. 5 is a side elevational view, partly in section, of a dynamo-electric machine having a stationary member provided with an embodiment of our improved excitation system; Fig. 6 is an end elevation view of the dynamo-electric machine shown in Fig. 5; and Fig. 7 is a modified form of construction which may be employed in our improved excitation system.

In the embodiment of our invention which is illustrated in the drawing we provide a dynamo-electric machine 27 with a magnetic field structure for producing the excitation which comprises permanent magnet pole pieces 24 to which are secured soft iron pole faces 26. Positioned interiorly of the permanent magnets, that is embedded therein, and in contact with the pole faces and a magnetic yoke 38 of the field structure, and in the direction of the polar axis of each of the permanent magnets is a plurality of thermo-magnetic shunts 14 having negative temperature coefficients of magnetic permeability. By this we mean that the magnetic shunts consist of an alloy having the characteristic that its permeability varies inversely with changes in temperature. Inasmuch as the flux produced by the permanent magnets tends to diminish with increasing temperature, the temperature sensitive magnetic shunts tend to divert an increasingly less percentage of the flux produced by the magnets from the air gap of the dynamo-electric machine and thus serve to compensate for substantially all of the effect of temperature changes on the air gap flux. In other words, the air gap flux and, for the particular application described hereinbefore, the voltage output at any given speed, is maintained substantially constant in the working range of temperature variation.

Referring more particularly to the drawing, in Figs. 1 and 2 we have illustrated a cylindrical member 10 preferably composed of a suitable magnetic material of relatively high permeability and high saturation value, such as soft iron or soft steel. Positioned in slots 11 formed longitudinally in the outer surface of the member 10 is a plurality of spacer elements 12 which may be composed of a suitable material such, for example, as graphite. In the particular arrangement shown, the spacer elements are three in number and are equidistantly spaced about the periphery of the cylinder 10. Secured to the periphery of the cylindrical member 10 is a plurality of short elements 14 in the form of studs or projections composed of a negative temperature coefficient thermo-magnetic alloy which may be welded radially or perpendicularly to the tubular member as indicated at 16. If desired, these studs may be threaded and secured into holes drilled and tapped into the cylindrical member. In the illustrated embodiment, we have shown the elements 14 arranged in circumferentially and longitudinally spaced apart relation about the outer surface of the cylindrical member 10, there being four elements employed between any given pair of spacer elements. However, this particular arrangement is shown and described merely by way of illustration as any number of elements may be employed depending upon the requirements to be met.

Permanent magnet material 18 is cast in place between the spacer elements 12 about the tubular member 10 and the studs 14 forming an outer periphery generally in the form of a cylinder. When the molten permanent magnet material cools, it tends to shrink, and thereby secures the permanent magnet portions to the cylindrical member 10. After the material has cooled sufficiently, the outer surface 20 is finished by suitable means to form a smooth cylindrical surface leaving the outer ends of the studs 14 flush therewith. The cylindrical member is then cut longitudinally at three points as shown at 22 leaving three sector shaped portions as illustrated in Fig. 4. It will thus be seen, by referring to Fig. 4, that three field producing members have been formed each comprising a permanent magnet pole piece or pad 24, four thermo-magnetic studs 14, and a pole face 26 of magnetic material.

In Figs. 5 and 6 we have illustrated a dynamo-electric machine 27 comprising a rotatable member having a laminated core 30 with a winding arranged thereon in slots 32 and connected to a commutator 34. In the illustrated embodiment, this rotatable member is essentially a conventional direct current armature and is mounted on a rotatable shaft 36. The excitation system of the dynamo-electric machine 27 comprises a stationary member arranged to cooperate electrodynamically with the rotatable member and includes two transversely-arranged, short bar-type permanent magnet pads or pole pieces 24 of the type shown in Fig. 4. These permanent magnet pole pieces 24 are provided with pole faces 26 of high permeability magnetic material as shown in Fig. 4 and are mounted on a cylindrical supporting frame or yoke 38 of high permeability soft magnetic material. The sets of circumferentially and longitudinally spaced-apart thermomagnetic studs or insert elements 14 extend from the pole faces 26 and are preferably secured thereto by welding as shown at 16 in Figs. 1 and 2. In a dynamo-electric machine provided with this type of permanent magnet pole piece, it has been found desirable to construct the pole pieces 24 of substantially greater axial length than the length of the rotatable magnetic core 30, in order to obtain the desired flux density in the air gap. The magnetic soft iron or soft steel pole faces 26, which are carried on the outer surfaces 25 of the pole pieces, act as flux concentrators. These pole faces provide a path of low magnetic reluctance for the flux produced by the portion of the pole pieces extending beyond the air gap between the pole pieces and the magnetic core 30, in completing the magnetic circuit through the rotatable core 30, thereby minimizing flux leakage at the ends of the pole faces 26. This feature of this construction is disclosed and claimed in U. S. Patent No. 2,059,886, granted November 3, 1936, to F. W. Merrill, and assigned to the General Electric Company, assignee of the present invention.

These studs 14, as explained heretofore and for most satisfactory operation, extend throughout the length of the magnetic or polar axis of each pole piece 24, that is, from pole to pole of each magnet, and are in engagement with the supporting frame 38. The permanent magnet pole piece 24 may be held in engagement with the supporting frame 38 by welding as indicated at 40 or the magnet may be welded to the frame 38 at 42, if desired. In small dynamo-electric machines, the yoke 38, the magnets 24, and the pole faces 26 will be of such a curvature that there is sufficient angularity between the magnetic studs 14 to hold them firmly in place in the magnetic material surrounding them so that each pole face 26 is maintained in position against its associated permanent magnet 24. However, if desired and within our invention the studs 14 may be provided with knurls or threads as indicated in Fig. 7 by the numeral 14'. Such a construction provides a roughened surface to prevent slipping of the stud relative to the magnet, and may be found of particular advantage in larger machines.

In the composition of the pole pieces 24 we employ permanent magnet materials of high magnetic retentivity. A material which we have used with highly satisfactory results for the permanent magnet pads 24 is an alloy containing iron, nickel, and aluminum as the basic or essential ingredients and prepared as described, for example, in United States patents to Mishima, 2,027,994 to 2,028,000, inclusive and 1,947,274 and 1,968,564 to William E. Ruder. Such magnetic material is characterized by a high coercive force and a fairly high residual induction, with the result that it provides a relatively large amount of magnetic energy per unit volume and, furthermore, it retains its magnetism almost indefinitely. These alloys generally, however, are not readily adaptable to machining operations because they are extremely brittle and hard. The present construction is thus quite suitable to the use of such materials in that the permanent magnet material is cast in place about the pole faces and the magnetic inserts and then provided with a smooth surface by grinding the surface which makes contact with the yoke.

In the construction of the magnetic studs 14, we not only employ a magnetic material but a material whose permeability changes with temperature and, in the application described, where it is desired to maintain a substantially constant flux in the air gap over a comparatively wide temperature range, we compose these studs or inserts of a thermo-magnetic material having a negative temperature coefficient of permeability. We do not limit ourselves to the employment of a particular thermal sensitive magnetic material for composing the thermo-magnetic studs or inserts 14 to be used internally of the permanent magnet material described, but we have found that highly satisfactory results may be obtained by the employment of an alloy composed of substantially 70% iron and 30% nickel. We have also found that satisfactory results may be obtained by the employment of a Curie alloy composed of substantially 68% nickel, 30% copper and approximately 2% iron.

The arrangement employed in the present invention is of simple and sturdy construction. The magnetic shunts not only serve the function of compensating for the loss of flux from the magnet due to temperature effects but they also serve as a means for holding the pole faces in position against the permanent magnet pole pieces. We do not limit our invention to the construction of a stationary field structure for a dynamo-electric machine since the principles disclosed may also be utilized in connection with a rotatable field structure as will be well understood by those skilled in the art. For example, such a structure, as shown in Fig. 1 of U. S. Patent 2,193,675, Merrill, may be employed when it is desired to apply the principles of our invention to the rotatable field structure of a dynamo-electric machine. We wish to point out also that our invention may also be applied to the field structures of alternating current dynamo-electric machines, as will be understood by those skilled in the art.

In accordance with the provisions of the patent statutes, we have described the principle of operation of our invention together with the apparatus which we now consider to represent the best embodiment thereof but we desire to have it understood that the apparatus shown is only illustrative and that the invention may be carried out by other means.

What we claim as new and desire to secure by Letters Patent of the United States, is:

1. In combination in a permanent magnet excitation system for a dynamo-electric machine having a core of magnetic material provided with a winding, a plurality of permanent magnet pole pieces arranged to cooperate electrodynamically with said core, a member of magnetic material arranged to support said pole pieces and forming a part of the magnetic circuit thereof, a pole face of magnetic material carried by each of said pole pieces, and a plurality of members of magnetic material embedded in each of said permanent magnets, the embedded magnetic material members of each magnet extending through the magnet from said pole face to said supporting member of magnetic material and said embedded magnetic members having the characteristic of changing their permeability inversely in response to changes in temperature substantially to compensate said magnet for variations of flux therein due to said temperature changes.

2. A dynamo-electric machine having a core of magnetic material provided with a winding, a magnetic excitation system including a plurality of permanent magnet pole pieces arranged to cooperate electrodynamically with said core, a member of magnetic material arranged to support said pole pieces and forming a return path for the flux produced thereby, a pole face of magnetic material carried by each of said pole pieces, and a plurality of inserts of magnetic material positioned in spaced apart relationship and extending through said permanent magnet pole pieces in the direction of the polar axes thereof, said inserts in each of said pole pieces being in contact with said supporting member and one of said pole faces and having a negative temperature coefficient of magnetic permeability whereby the tendency of the useful flux produced by said permanent magnet pole piece to vary with changes in temperature is substantially compensated.

3. A dynamo-electric machine having a core of magnetic material provided with a winding, a magnetic excitation system including a plurality of permanent magnet pole pieces arranged to cooperate electrodynamically with said core, a member of magnetic material arranged to support said pole pieces and forming a return path for the flux produced thereby, a pole face of magnetic material carried by each of said pole pieces, and a plurality of inserts of magnetic material positioned in spaced apart relationship and extending through each of said permanent magnet pole pieces in the direction of the polar axis thereof, said inserts in each of said pole pieces being secured to one of said pole faces, and said inserts being in contact with said supporting member and said one of said pole faces and having a negative temperature coefficient of magnetic permeability whereby the tendency of the air gap flux produced by said permanent magnet pole pieces to change with temperature variations of said magnets is substantially eliminated.

4. In combination in a permanent magnet excitation system for a dynamo-electric machine, a pole face member composed of high permeability high saturation magnetic material, a flux carrying member composed of high permeability high saturation magnetic material spaced from said pole face, a thermo-magnetic member secured to said pole face and adapted to be positioned intermediate said pole face member and said flux carrying member, a permanent magnet alloy cast about said thermo-magnetic member and in contact with said pole face member, said magnet and said thermo-magnetic member extending from said pole face member to said flux carrying member, said thermo-magnetic member having the characteristic that its permeability undergoes a substantial change with temperature variations to alter the percentage of the magnetic flux produced by said magnet which passes through said thermo-magnetic member, and means for securing said magnet to said flux carrying member.

5. In combination in an excitation system for a dynamo-electric machine, a plurality of magnetic field producing means each comprising a permanent magnet pole piece and a pole face member secured to one of the polar surfaces thereof for concentrating the flux of said magnet in a working air gap, a return flux carrying member secured to the other polar surface of each of said magnets, and a thermo-magnetic member embedded in each of said pole pieces and extending from pole to pole thereof between said pole face member and said return flux carrying member, said thermo-magnetic member being composed of an alloy whose magnetic permeability varies inversely with temperature changes to maintain said air gap flux substantially constant over a wide temperature range irrespective of variations in the total flux produced by said permanent magnet due to said temperature changes.

6. In combination in a permanent magnet excitation system for a dynamo-electric machine, a pole face member composed of high permeability magnetic material, a flux carrying member composed of high permeability magnetic material spaced from said pole face member, thermo-magnetic means comprising at least one thermo-magnetic member secured to said pole face member and extending in a substantially radial direction from said pole face member toward said flux carrying member, a permanent magnet alloy cast about said thermo-magnetic means and making contact with said pole face member and said flux carrying member, said thermo-magnetic means having a negative temperature coefficient of permeability to maintain the flux passing through said pole face member at a substantially constant value over a wide temperature range, said thermo-magnetic means being adapted to support said pole face member in contact with said magnet, and means for securing said magnet to said flux carrying member.

WESLEY R. GOSS.
DAVID R. SHOULTS.